(12) United States Patent
Mestemaker et al.

(10) Patent No.: US 8,812,659 B2
(45) Date of Patent: Aug. 19, 2014

(54) FEEDBACK-BASED SYMPTOM AND CONDITION CORRELATION

(75) Inventors: Paul A. Mestemaker, Bellevue, WA (US); Adam C. DePue, Kirkland, WA (US); Prasanna Kumar Jayapal, Bothell, WA (US); Lorenzo Rizzi, Kirkland, WA (US); Mark Gilbert, Seattle, WA (US); Ashvin J. Sanghvi, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 190 days.

(21) Appl. No.: 13/115,996

(22) Filed: May 26, 2011

(65) Prior Publication Data

US 2012/0303793 A1 Nov. 29, 2012

(51) Int. Cl.
*H04L 12/24* (2006.01)

(52) U.S. Cl.
USPC ......................................................... 709/224

(58) Field of Classification Search
USPC ............ 709/204, 206, 217, 224, 223; 706/12, 706/47, 52, 50; 370/241, 230; 707/707, 707/708, 602; 717/113; 726/22
See application file for complete search history.

(56) References Cited

U.S. PATENT DOCUMENTS

| | | | | |
|---|---|---|---|---|
| 5,493,729 A * | 2/1996 | Nigawara et al. | ............... | 706/52 |
| 6,438,580 B1 * | 8/2002 | Mears et al. | .................. | 709/204 |
| 7,209,860 B2 * | 4/2007 | Trsar et al. | .................... | 702/183 |
| 7,493,298 B2 * | 2/2009 | Buckley | ......................... | 706/47 |
| 7,698,255 B2 * | 4/2010 | Goodwin et al. | ............. | 707/707 |
| 7,721,310 B2 * | 5/2010 | Schaffer et al. | ................. | 725/46 |
| 7,734,575 B1 * | 6/2010 | Kleinmann | .................... | 707/602 |
| 7,853,582 B2 * | 12/2010 | Gopalakrishnan | ............ | 707/708 |
| 8,104,080 B2 * | 1/2012 | Burns et al. | ...................... | 726/14 |
| 8,170,975 B1 * | 5/2012 | Qureshi et al. | .................. | 706/47 |
| 8,271,416 B2 * | 9/2012 | Al-Beik et al. | ................. | 706/47 |
| 2002/0099818 A1 * | 7/2002 | Russell et al. | ................ | 709/224 |
| 2005/0235259 A1 * | 10/2005 | Lueckhoff | ..................... | 717/113 |
| 2005/0262237 A1 * | 11/2005 | Fulton et al. | .................. | 709/224 |
| 2006/0156141 A1 | 7/2006 | Ouchi | | |

(Continued)

OTHER PUBLICATIONS

Noah, et al., "A Selective Review of Knowledge-Based Approaches to Database Design", Retrieved at << http://informationr.net/ir/1-2/paper4.html>>, Information Research, vol. 1 No. 2, Dec. 1995, pp. 9.

(Continued)

*Primary Examiner* — Chirag Shah
*Assistant Examiner* — Jael Ulysse
(74) *Attorney, Agent, or Firm* — Jim Sfekas; Kate Drakos; Micky Minhas

(57) ABSTRACT

Feedback data can be received from client agents running on client computer systems. The feedback data can include data on the symptoms and conditions for rules that relate computer system symptoms to computer system conditions. The feedback data can be analyzed to produce correlation information that quantifies a degree of correlation between the symptom(s) and condition(s) related by the rule(s). It may be determined whether analysis of the feedback data warrants including one of the rules in correlation mappings to be applied to monitored computer systems. If so, then that rule can be included in the mappings. Information representing the correlation mappings may be transmitted to the monitored computer system(s). Additionally, information representing the correlation mappings may be transmitted to the monitored computer system(s), and types of feedback data collected from the client agents can be altered on the basis of the correlation information.

20 Claims, 5 Drawing Sheets

(56) References Cited

U.S. PATENT DOCUMENTS

| | | | |
|---|---|---|---|
| 2007/0053513 A1* | 3/2007 | Hoffberg | 380/201 |
| 2007/0058540 A1* | 3/2007 | Kay | 370/230 |
| 2007/0094212 A1* | 4/2007 | Das et al. | 706/50 |
| 2007/0162973 A1* | 7/2007 | Schneier et al. | 726/22 |
| 2008/0222582 A1* | 9/2008 | Bohl et al. | 716/4 |
| 2008/0320088 A1* | 12/2008 | Jung et al. | 709/206 |
| 2008/0320098 A1* | 12/2008 | Jung et al. | 709/217 |
| 2009/0292383 A1* | 11/2009 | Bohl et al. | 700/103 |
| 2010/0095157 A1* | 4/2010 | Aoyama et al. | 714/37 |
| 2010/0169245 A1* | 7/2010 | Basel et al. | 706/12 |
| 2011/0010209 A1* | 1/2011 | McNally | 705/7 |
| 2011/0231704 A1* | 9/2011 | Ge et al. | 714/26 |
| 2012/0066194 A1* | 3/2012 | Eisenreich | 707/705 |
| 2012/0208562 A1* | 8/2012 | Wilkin et al. | 455/456.3 |

OTHER PUBLICATIONS

Meseguer, Pedro, "Expert System Validation Through Knowledge Base Refinement", Retrieved at << http://www.google.co.in/url?sa=t&source=web&cd=9&ved=0CGYQFjAl&url=http%3A%2F%2Fciteseerx.ist.psu.edu%2Fviewdoc%2Fdownload%3Fdoi%3D10.1.1.80.4374%26rep%3Drep1%26type%3Dpdf&ei=35OJTfOVDcyYhQeVld2-Dg&usg=AFQjCNEYeUiyV4sLM_xyM5HWHyUVmwYifQ&sig2=6hnTuSyWuGZMRu >>, Proceedings of the 13th international joint conference on Artifical intelligence, vol. 1, 1993, p. 477-482.

* cited by examiner

FEEDBACK-BASED SYMPTOM AND CONDITION CORRELATION

BACKGROUND

In environments running computer systems and applications, there can exist a set of problems that can be represented by mappings between symptoms and computer system conditions that may be causing the symptoms. Such mappings have been generated by expert users inputting known symptoms and known conditions that may cause those symptoms. The mappings may then be used to suggest to users how the computer system conditions may be changed to alleviate the computer system symptoms.

Existing tools can facilitate collection of information from computer systems. Additionally, some tools can use collected information to help identify issues in computer product design or computer code.

SUMMARY

The tools and techniques described herein relate to compilation and use of correlation information that can represent correlations between one or more symptoms and one or more computer conditions, such as computer settings, states, perf counters, etc. Such correlation information may be shared with client computer systems (which are clients of a correlation information system, but may themselves be servers such as file servers, database servers, web servers, etc.), and feedback data may be obtained from client systems and used to refine the correlation information and/or the collection of the feedback data.

In one embodiment, the tools and techniques can include receiving user input at a computer system. The user input can identify one or more rules. Each of the rule(s) can relate one or more computer system symptoms to one or more computer system conditions. Feedback data can be received from client agents running on client computer systems. The feedback data can include data on the one or more symptoms in the client computer systems for each of the one or more rules. The feedback data can also include data on the one or more conditions in the client computer systems for each of the one or more rules. The feedback data can be analyzed to produce correlation information for each of the rule(s). The correlation information can quantify a degree of correlation between the symptom(s) and the condition(s) related by each of the rule(s). Computer support information can be derived from at least one of the rule(s), and the support information may be sent to computer systems such as the client computer systems. For example, it may be determined whether analysis of the feedback data warrants including at least one of the one or more rules in a set of correlation mappings to be applied to a set of one or more monitored computer systems. If analysis of the feedback data warrants including at least one of the rule(s) in the set of correlation mappings, then at least one of the rule(s) can be included in the set of mappings. Additionally, information representing the set of correlation mappings may be transmitted to the set of one or more monitored computer systems. Additionally, types of feedback data collected from the client agents can be altered on the basis of the correlation information.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
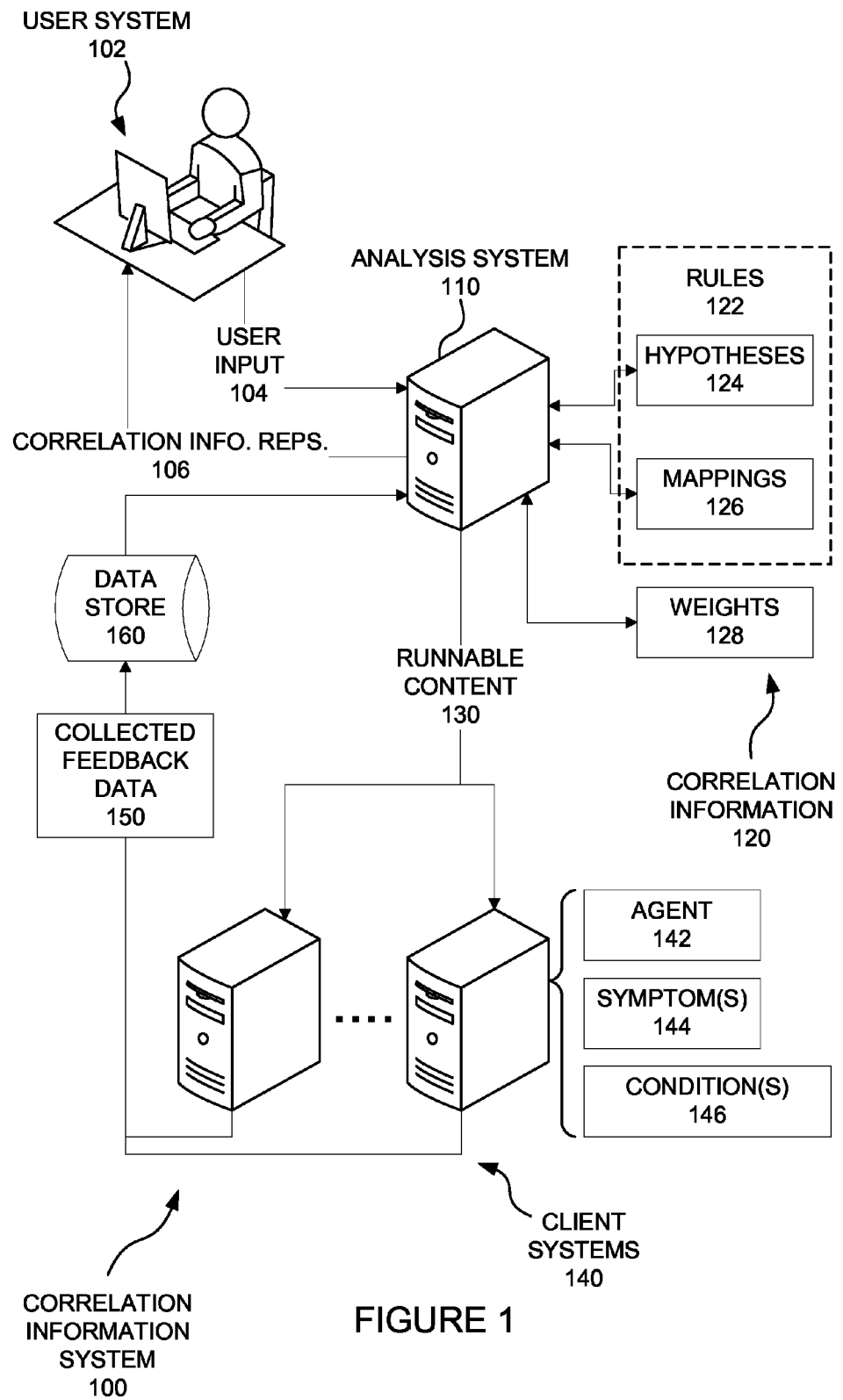
FIG. 1 is a schematic diagram of a correlation information system.

Embodiments described herein are directed to techniques and tools for improved generation and/or use of correlation information that correlates computer system symptoms to computer system conditions. Such improvements may result from the use of various techniques and tools separately or in combination.

The tools and techniques can include running distributed content in client machines to monitor each machine to watch for support issues that arise or may arise in the future. Mappings can be used to distribute the content that helps to identify a set of known conditions (settings, features, etc.) that could lead to specific symptoms, such as symptoms that can be viewed as poor behavior for the client machine (which may be a machine that is acting as a server for other machines even though the machine is a client of the correlation information system). The tools and techniques described here can include allowing mapping hypotheses to be validated against collected feedback data before including the hypotheses as mappings in a set of mappings to be applied to client machines. The correlation rules (mappings and the hypotheses) may be analyzed to produce correlation information, which may be in the form of weights for the rules.

Concepts of symptoms, conditions, symptom-condition rules, symptom-condition hypotheses, symptom-condition mappings, conditions, and weights will now be discussed.

A symptom is some behavior exhibited in a computer system. A symptom may be undesirable, and can be readable from a system or determined using instrumentation, such as instrumentation of running systems or management systems that are managing running systems. For example, symptoms may be behaviors that can be derived from event log entries. A computer system condition is a measurable condition of a computer system, such as a condition (e.g., a setting or feature) that can be modified in response to user input. There may be correlations between the conditions and symptoms. For example, it may be found that a symptom arises when conditions of a computer system are changed so that a certain set of one or more conditions are present. Likewise, it may be found that a symptom goes away when conditions of a computer system are changed so that a certain set of one or more conditions are present.

A rule is a data representation that relates one or more conditions to one or more symptoms, such as by specifying a relationship between a set of condition(s) and a set of symptom(s). The rule may specify the relationship in different ways. For example, the rule may specify that a particular condition is present. Alternatively, a rule may specify that a particular condition is not present. As yet another alternative, a rule could specify that one of three specified conditions is present. As a specific example, a rule may specify that a symptom is linked to having at least three network cards, having tcp offloading enabled on all of them, and having them all set in duplex sharing mode. Alternatively, the rule could specify that a symptom is linked to having at least three network cards, at least one of which has tcp offloading enabled and is set in duplex sharing mode. If the rule were applied to a system, an alert could be raised if the system has the set of conditions, as specified by the rule.

A weight is a value representing a quantification of a degree of correlation between the condition(s) and symptom(s) of a rule, as revealed from correlation data derived from measured conditions and symptoms of client computer systems. For example, correlation information may include a weight that may represent a percentage of the times when the specified symptom(s) arise at a time when the specified condition(s) also arise (e.g., if the conditions are settings, the settings may be changed to match the rule and the symptom(s) may arise at that time). As another example, a weight may represent a percentage of times when the specified symptom(s) and condition(s) coexist, compared to a percentage of times when the condition(s) exist without the symptom(s) being present.

A condition is a further qualification that can be applied to a rule in determining whether the rule applies to client computer systems. Such conditions can narrow the target population of client computer systems for a rule, and can increase the weight of the rule. For example, a condition may be that a client system is running a specific software application. Also, a condition for one rule (e.g., a mapping) may refer to another rule (e.g., a mapping). For example, rule A may be linked to rule B, so that rule B only applies to a computer system if rule A also applies to that computer system. Thus, the weight of rule A can be affected if, for example, it is found that rule B applies to a system but rule A does not apply.

A hypothesis is a candidate rule, which may be provided by user input (such as input from an expert) or found through analysis data, or by other techniques. A hypothesis may initially have an ill-defined condition and may not have a weight. A hypothesis can be validated and included as a mapping to be applied to client computer systems if the inclusion is warranted by correlation information, which can quantify degrees of correlation between sets of symptoms and sets of conditions. The correlation information may be produced by analyzing information from client computer systems, including conditions and symptoms of the client computer systems. As an example, user input may indicate that inclusion of a hypothesis in the mappings is warranted after correlation information for the hypothesis has been presented (e.g., on a display). Alternatively, an automated analysis component could validate hypotheses with weights that exceed a threshold value. As a specific example, a hypothesis may specify that if average IO (calculated from perf counters) is greater than 70% of the IO Capacity (calculated from discovery/settings), then bad transaction performance (the symptom) will result. When this hypothesis is checked against data collected from many computer systems, a weighted correlation can be assigned and that weight can be continued to be refined as the hypothesis is checked against additional collected data.

I. Correlation Information System and Environment

FIG. 1 is a schematic diagram of a correlation information system (100) in conjunction with which one or more of the described embodiments may be implemented. The correlation information system (100) can include a user system (102), which can provide user input (104) to and receive correlation information representations (106) from an analysis system (110). In some implementations, the user system (102) may be the same system as the analysis system (110).

The user input may define rules (122), which may include hypotheses (124) and mappings (126). The rules (122) can each link one or more conditions to one or more symptoms according to one or more conditions or criteria. The rules can be accessed and/or maintained by the analysis system (110). The analysis system can produce correlation information (120), which can include the rules (122) themselves, and may also include additional information such as weights (128) for the rules (122).

The analysis system (110) can provide runnable content (130) to client systems (140) to instruct the client systems (140) on how to collect information from the client systems (140). The runnable content (130) may also include additional information, such as computer system support information, which could include instructions for applying mappings (126) in the client systems to raise alerts, provide suggested changes, etc. The client systems (140) may include various different types of computer systems such as systems that are single physical and/or virtual machines, systems that are groups of physical and/or virtual machines, etc. As used herein, a computer system includes one or more computers, and may also include one or more other devices such as network and/or storage devices that are configured to deliver a service. A computer includes a processor and memory, and may also include other features, such as other features of the computing environment discussed below with reference to FIG. 2. The computer(s) and device(s) in the computer system can be physical and/or virtual. The client systems (140) can run agents (142), which may be software modules that can determine symptoms (144) and conditions (146) of the client systems (140) upon which they are running and/or symptoms and conditions of other related client systems (140). For example, an agent (142) running on a server that is managing multiple machines may collect symptoms and conditions for each of the managed machines and/or for an overall environment being managed. The agent (142) may collect data in any of various ways. For example, an agent (142) may monitor the client system (140) periodically (e.g., every 4 to 8 hours), and may collect and transmit only symptoms and conditions that have changed since the agent (142) last monitored the client system (140).

The client systems (140) can send the collected feedback data (150) to a data store (160). The analysis system (110) can access the data store (160) to analyze the collected feedback data (150), such as to produce correlation information (120) (e.g., weights for the rules (122)).

A. Defining, Validating and Applying Mappings

Referring still to FIG. 1, the techniques and tools described herein may include the analysis system (110) maintaining a database of the rules (122) that link symptoms (144) to computer system conditions (146), wherein the conditions can be fixable in response to user input, such as user input provided at the client systems (140), configuration changes in the client systems (140), etc.

In starting the correlation information system (100), the conditions (146), symptoms (144) and their relationships can be defined in the rules (122), which can start out as hypotheses (124). The hypotheses (124) and corresponding weights (128) can be analyzed using the collected feedback data (150) to determine whether the weights (128) of the hypotheses (124) warrant including each hypothesis (124) in the mappings (126) to be applied to the clients systems (140). This determination may include receiving user input (104) after correlation information representations (106) for the hypotheses (124) have been presented on the user system (102). Alternatively, the determination may be made in a more automated way, such as by automatically comparing weights (128) of the hypotheses (124) with predetermined threshold weights that could have been established based on user input (104) and/or past automated analysis. If weights (128) are above the threshold, corresponding hypotheses (124) can be considered established, possibly after approval from user input (104). The analysis of the hypotheses (124) may be done using collected feedback data (150) that is already in the data store (160), or additional data may be collected prior to analyzing the hypotheses (124) (e.g., by specifying the additional data to be collected in the runnable content (130)). For example, analysis may be performed after further data collection if a hypothesis (124) specifies a condition (146) for which data has not previously been collected. The hypotheses (124) and the mappings (126) may be defined by user input (104) (e.g., input from experts) and/or by information from other sources.

The symptom-condition mappings (126) can be applied to the client computer systems (140). For example, the mappings (126) may be used to raise alerts to symptoms (144) or potential symptoms and/or to advise changes that would remove the conditions (146) to which the symptoms (144) or potential symptoms are mapped in the mappings (126). Each client system (140) may apply mappings (126), collect data, and send the collected feedback data (150) on a periodic basis according to a set schedule, or according to some other technique. For example, data collection may be triggered by user input, automatically triggered by an event (e.g., a new software application being installed or a setting being changed), etc.

Initially, a mapping (126) may be distributed in the runnable content (130) to only a small number of client systems (140) (the runnable content (130) can be different for different client systems (140)). As the mapping (126) continues to prove to be valid, its weight (128) may remain high or even increase. If so, the particular mapping (126) may be distributed more broadly to a larger set of client systems (140). For example, a mapping (126) may link a symptom (144) such as slow response time to a condition (146), which may be a configuration setting being at a given value. As the configuration setting is altered in many client systems (140), the response time may decrease to an acceptable time in those systems (140). Each time this occurs, the mapping (126) can have its weight (128) increase in the correlation information. Accordingly, the mapping (126) can be shown to be valid and can be distributed more broadly. Additionally, if a weight (128) for a mapping decreases, that mapping (126) may be distributed to a smaller subset of the client systems (140). Eventually, the mapping (126) may be removed from the set of mappings (126).

B. Refinement of Mappings and Data Collection

The set of mappings (126) to be applied to the client systems (140) can be repeatedly refined by adding and/or removing symptoms (144) and/or conditions (146) from mappings (sometimes referred to herein as removing and/or adding condition items from mappings). For example, symptoms (144) and/or conditions (146) may be reported from other sources (e.g., user input from non-expert users) or user input from experts. Further, hypotheses (124) of symptom-cause relationships can be tested against collected feedback data (150), and the weights (128) can be adjusted and conditions can be narrowed for the hypotheses (124) and mappings (126).

This refinement of the mappings (126) can be used to refine types of data collected from the client computer systems (140). Additionally, collected feedback data (150) can be used in a knowledge loop to help facilitate future hypotheses (124) and mappings (126).

Changes to the weights (128) and mappings (126) may arise for various reasons. For example, new software versions and patches may be installed in the client systems (140), known best practices may change, conditions surrounding the client computer systems (140) may change, etc. As an example of this refinement, if the weight (128) of a mapping (126) drops below a specified level, the mapping (126) may be removed from the set of mappings (126). For example, this removal may happen in an automated manner and/or in response to user input (104) after weights (128) are presented to a user as part of the correlation information representations (106).

As the size of the set of mappings (126) increases, the cost of data collection and processing may also increase. Accordingly, one or more of various pruning techniques can be used to reduce the load on the overall correlation information system (100). This may include removing existing mappings (126) whose weights have dropped, as discussed above. The load on the correlation information system (100) may also be decreased using conditional collection of data and sampling adjustments based on weights.

Conditional collection of data refers to avoiding collection of data where conditions reveal that the collection may not be useful. As noted above, the rules can be conditional (e.g., a mapping (126) applies to a client system (140) only if the system is running a specified version, or set of versions, of a software application). Accordingly, if a symptom (144) or condition (146) does not apply to any of the rules (122) (which can include the hypotheses (124) and the validated mappings (126)) for a specified condition, data representing that symptom (144) or condition (146) may not be collected unless the particular condition is present. For example, data on some settings may only be collected if a computer system is running a specified software product or has a specified type of hardware device.

As noted, sampling or collection of data for use in correlation analysis by the analysis system (110) may be adjusted based on the weights (128) of the rules (122) to reduce the load on the correlation information system (100). For example, if a weight (128) of a mapping (126) drops below a level, the mapping (126) may be removed from the set of mappings (126), as noted above. Additionally, collection of conditions (146) and symptoms (144) only tied to that mapping (126), and not to other rules (122), may be discontinued. As another example, if a rule (122) has a high enough probability of being true, the data collection from the client computer systems (140) can sample for that rule (122) to be untrue. As yet another example, if a rule (122) has a weight (128) below a threshold, user input (104) and/or automated analysis of correlation information (120) may reveal conditions under which the weight (128) is higher. The rule (122) may be refined by adding those conditions to the rule. If the symptoms (144) and/or conditions (146) were only tied to that rule, then the client systems (140) may forego collecting data on those symptoms (144) and/or conditions (146) unless the conditions are present.

The load on the correlation information system (100) may also be decreased by collecting some information on the client systems (140) only when it has changed since the last time information was collected. For example, the runnable content (130) from the analysis system (110) may include representations of rules (122). The client systems (140) can each use those representations to determine which applicable conditions (146) and symptoms (144) from those rules (122) are present on that client system (140). Each client system (140) may also determine which, if any, of the mappings (126) is met for that client system (140). If specified conditions of a mapping (126) are met for the client system (140), an alert may be raised. For example, an alert may be raised by presenting the alert on the client system (140). Each client system (140) may send to the data store (160) the collected feedback data (150), which can include representations of symptoms (144) and conditions (146) from the rules (122) that have changed since collected feedback data was last sent from the client system (140). The collected feedback data (150) may also include alerts that were raised on the client system. In some instances, a mapping (126) may specify that an alert is to be raised if the specified conditions (146) are present on the client system (140), whether or not the specified symptoms (144) are also present. In other instances, a mapping (126) may specify that an alert is to be raised only if the specified conditions (146) and the specified symptom (144) are present on the client system (140). As another possibility, one alert may be raised if the conditions (146) are present but the symptoms (144) are not yet present, and a different alert may be raised if the conditions (146) and the symptoms (144) are present. Such different ways of specifying alerts may be set with a global setting for all the mappings (126) and/or on a per-mapping basis.

Accordingly, the tools and techniques can allow a user such as an expert to use collected feedback data to test a symptom-condition rule (122), validate the rule (122), include the rule (122) in the set of mappings (126), and repeatedly weigh the rule (122) to monitor the rule's continued validity. This feedback loop can allow the set of symptom-condition mappings (126) to continue to be monitored and refined. This refinement may use input (104) from a user such as an expert, and may also use automated analysis of collected feedback data (150) by the analysis system.

These tools and techniques may provide benefits described herein, such as a feedback loop that increases the value of the mappings (126) in aiding users of the client systems (140) in resolving symptoms (144) that arise in those client systems (140). However, the subject matter defined in the appended claims is not necessarily limited to the benefits described. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, dedicated hardware implementations, such as application specific integrated circuits, programmable logic arrays and other hardware devices, can be constructed to implement at least a portion of one or more of the techniques described herein. Applications that may include the apparatus and systems of various embodiments can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

II. Exemplary Computing Environment

Figure 2:
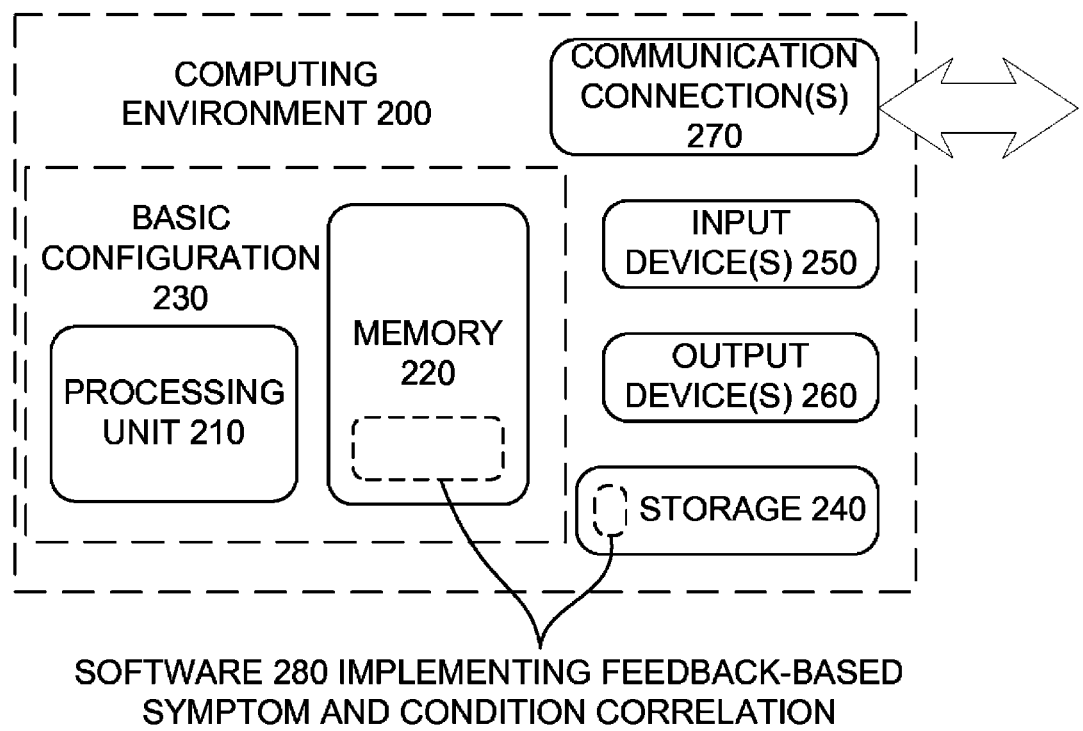
FIG. 2 is a block diagram of a suitable computing environment in which one or more of the described embodiments may be implemented.

FIG. 2 illustrates a generalized example of a suitable computing environment (200) in which one or more of the described embodiments may be implemented. For example, one or more such computing environments can be used as a client system, analysis system, data store, and/or user system. For example, one such environment may be used as the analysis system, the data store and the user system discussed above with reference to FIG. 1. Alternatively, these components could each be in different computing environments. Also, a component as discussed above, such as a computer system, could include multiple computing machines, and may include multiple computing environments as discussed below with reference to FIG. 2.

Generally, various different general purpose or special purpose computer system configurations can be used. Examples of well-known computer system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (200) is not intended to suggest any limitation as to scope of use or functionality of the invention, as the present invention may be implemented in diverse general-purpose or special-purpose computing environments.

With reference to FIG. 2, the computing environment (200) includes at least one processing unit (210) and at least one memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The at least one memory (220) may be volatile memory (e.g., registers, cache, RAM), non-volatile memory (e.g., ROM, EEPROM, flash memory), or some combination of the two. The at least one memory (220) stores software (280) implementing feedback-based symptom and condition correlation.

Although the various blocks of FIG. 2 are shown with lines for the sake of clarity, in reality, delineating various components is not so clear and, metaphorically, the lines of FIG. 2 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 2 is merely illustrative of an exemplary computing device that can be used in connection with one or more embodiments of the present invention. Distinction is not made between such categories as "workstation," "server," "laptop," "handheld device," etc., as all are contemplated within the scope of FIG. 2 and reference to "computer," "computing environment," or "computing device."

A computing environment (200) may have additional configurations. In FIG. 2, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (200). The storage (240) stores instructions for the software (280).

The input device(s) (250) may be a touch input device such as a keyboard, mouse, pen, or trackball; a voice input device; a scanning device; a network adapter; a CD/DVD reader; or another device that provides input to the computing environment (200). The output device(s) (260) may be a display, printer, speaker, CD/DVD-writer, network adapter, or another device that provides output from the computing environment (200).

The communication connection(s) (270) enable communication over a communication medium to another computing entity. Thus, the computing environment (200) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (200), computer-readable storage media include memory (220), storage (240), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

III. Feedback-Based Symptom and Condition Correlation Techniques

Several feedback-based symptom and condition correlation techniques will now be discussed. Each of these techniques can be performed in a computing environment. For example, each technique may be performed in a computer system that includes at least one processor and at least one memory including instructions stored thereon that when executed by the at least one processor cause the at least one processor to perform the technique (one or more memories store instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
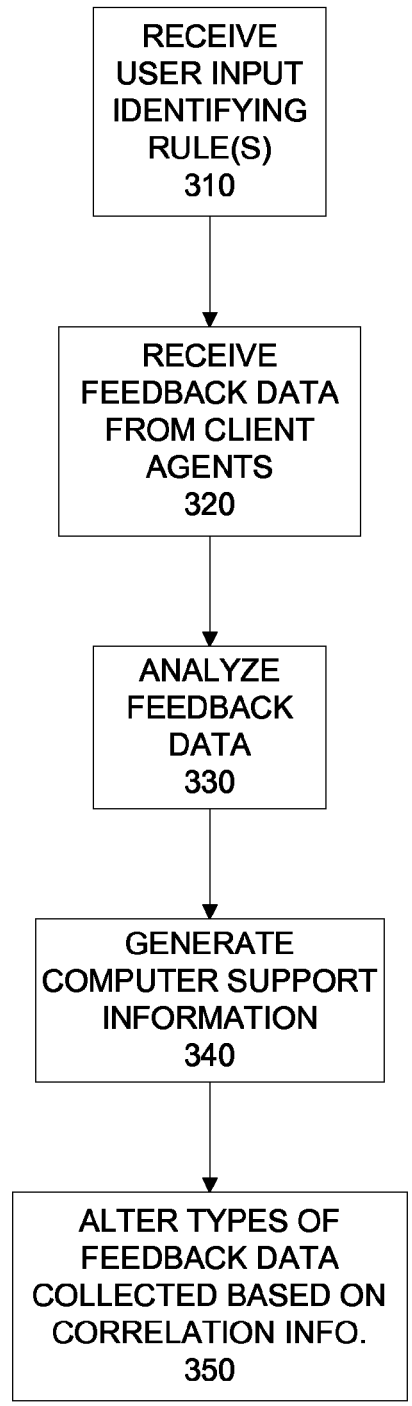
FIG. 3 is a flowchart of a feedback-based symptom and condition correlation technique.

Referring to FIG. 3, a feedback-based symptom and condition correlation technique will be described. The technique can include receiving (310) user input at a computer system. The user input can identify one or more rules, and each of the rule(s) can relate one or more computer system symptoms and one or more computer system conditions. Feedback data can be received (320) from multiple client agents running on multiple computer systems. The feedback data can include data on the symptom(s) in the computer system(s) for each of the rule(s) and on the condition(s) in the computer system(s) for each of the rule(s). The technique can also include analyzing (330) the feedback data to produce correlation information for each of the rule(s). The correlation information can quantify a degree of correlation between the symptom(s) and the condition(s) related by each of the rule(s). For example, the correlation information can include a correlation weight for each of the rule(s). Computer support information derived from at least one of the rule(s) can be generated (340), and this support information may be made available to computer systems such as the client systems from which the feedback data was collected. Also, types of feedback data collected from the client agents can be altered (350) based on the correlation information.

The rules can include one or more hypotheses and a set of one or more correlation mappings to be applied to a set of one or more computer systems. The technique may further include determining whether the correlation information warrants including at least one of the one or more hypotheses in the set of correlation mappings. Additionally, the technique can include including the at least one hypothesis in the set of correlation mappings if it is determined that the inclusion of the at least one hypothesis is warranted by the feedback data. Altering (350) may include instructing the client agents to refrain from collecting data related to one or more rules that have been removed from the set of one or more mappings. The technique may include applying the correlation mapping(s) to a set of computer systems. This application can include determining for each of these systems whether one or more of the mappings is met in that system. The technique may include processing an alert if one of the mappings is met in a system. Processing the alert may include presenting the alert at the system in which the mapping is met, and/or receiving the alert from a system in which the mapping is met. Additionally, the technique may include refining the set of correlation mappings based on the correlation information.

The technique may include instructing the client agents to limit the feedback data to data the meets one or more conditions. The feedback data may include one or more indications of one or more conditions that are not present on one or more computer systems and/or one or more conditions that are present on one or more computer systems.

Figure 4:
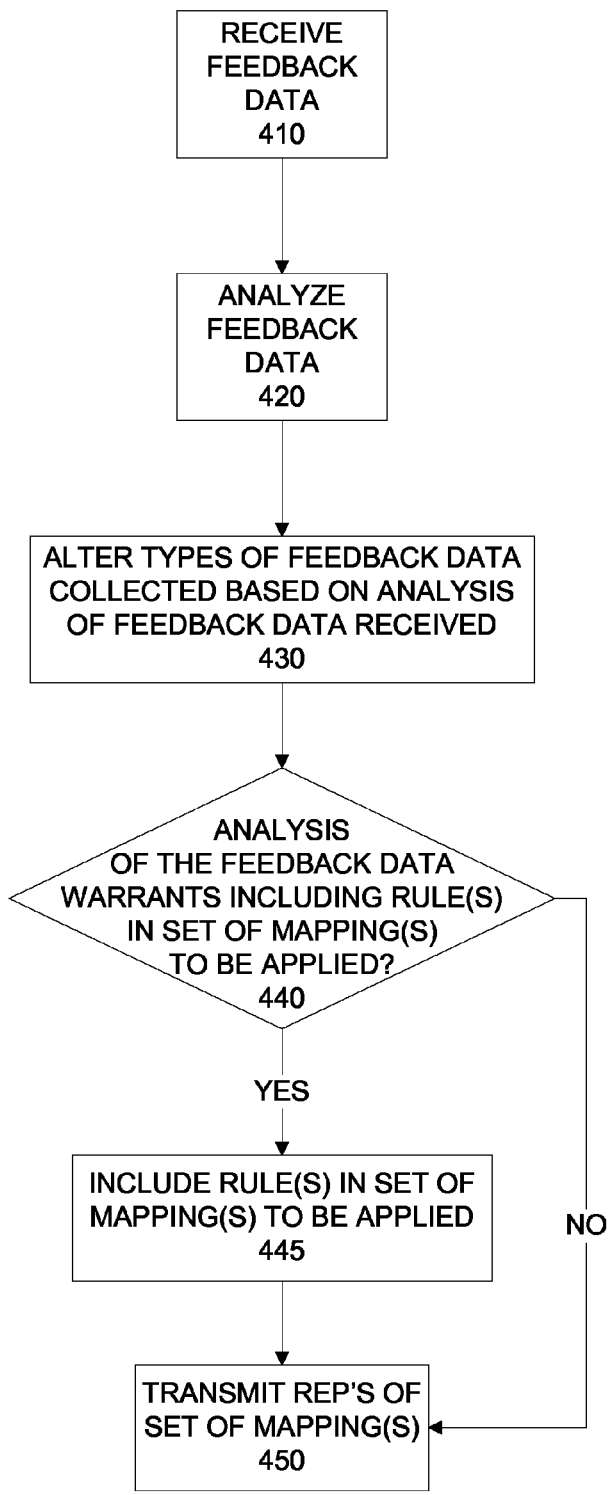
FIG. 4 is a flowchart of another feedback-based symptom and condition correlation technique.

Referring now to FIG. 4, another feedback-based symptom and condition correlation technique will be described. The technique can include receiving (410) feedback data from client agents running on client computer systems. The feedback data can include data on one or more computer system symptoms in the client computer systems for each of one or more rules and data on one or more computer system conditions in the client computer systems for each of the rule(s). Each of the rule(s) can relate one or more of the conditions to one or more of the symptoms. The feedback data can be analyzed (420) to produce correlation information for each of the rule(s). Types of feedback data collected from the client agents can be altered (430). The alteration (430) can be based on analysis of the feedback data. Altering (430) may include instructing the client agents to refrain from collecting data related to one or more rules that have been removed from the set of mappings. It can be determined (440) whether the analysis of the feedback data warrants including at least at least one of the one or more rules in a set of correlation mappings to be applied to a set of one or more systems. If the analysis of the feedback data does warrant including at least one of the rule(s) in the set of correlation mappings, then at least one of the rule(s) can be included (445) in the set of correlation mappings. Information representing the set of correlation mappings can be transmitted (450) to the set of one or more systems.

Additionally, the set of correlation mappings may be refined based on an analysis of addition feedback data received from the set of one or more systems applying the set of correlation mappings. Refining the set of correlation mappings may include altering a mapping by adding a computer system condition item to the altered mapping. Refining the set of mappings may include removing a computer system condition item from an altered mapping. The refining may include tracking correlation weights of the mappings. Also, refining may include removing one or more mappings from the set of correlation mappings. This removal may be based on correlation weights of one or more removed correlation mappings (e.g., a mapping may be removed if its weight dropped below a threshold value).

Figure 5:
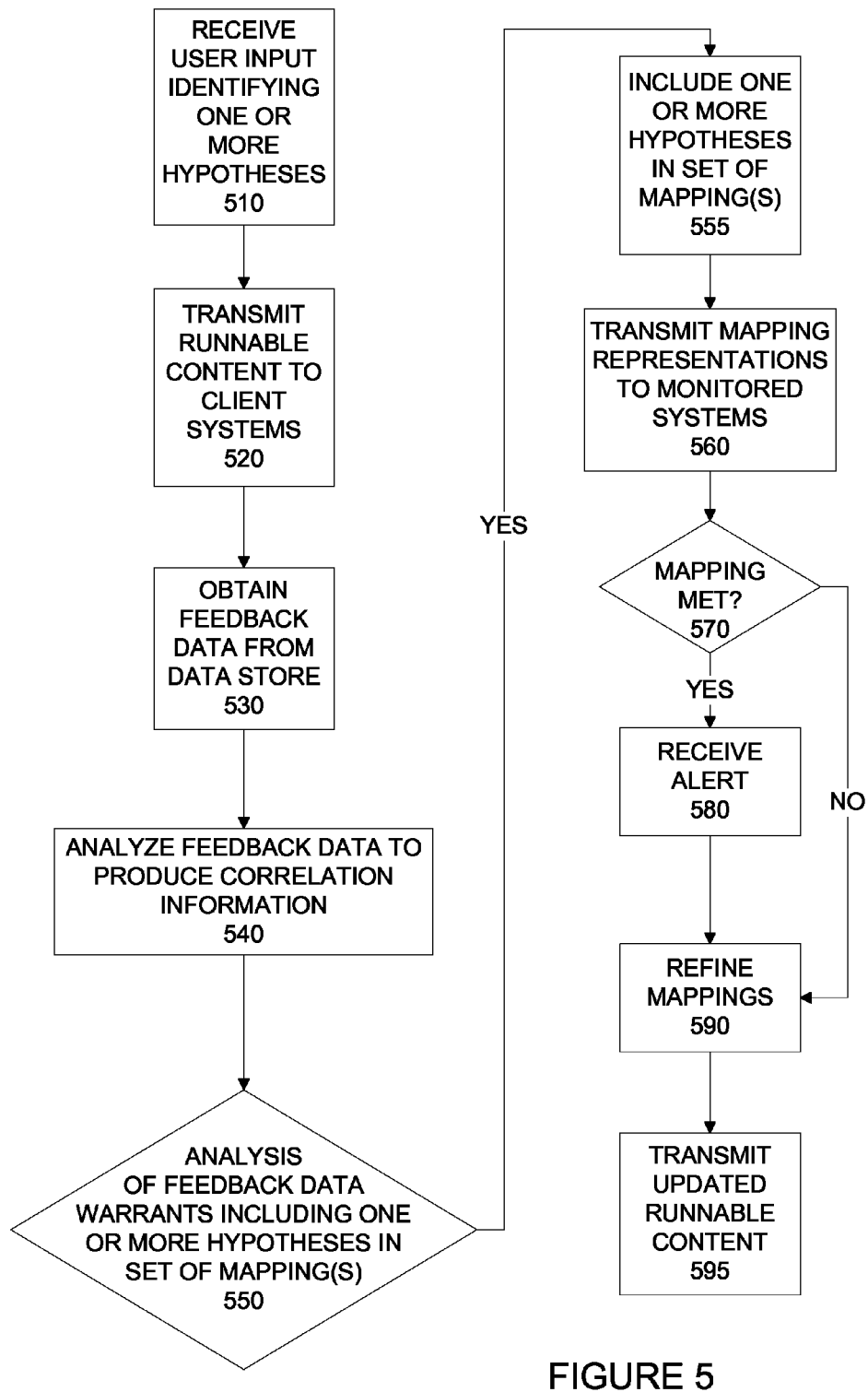
FIG. 5 is a flowchart of yet another feedback-based symptom and condition correlation technique.

Referring now to FIG. 5, yet another feedback-based symptom and condition correlation technique will be described. The technique can include receiving (510) user input identifying one or more hypotheses. Each of the one or more hypotheses can identify one or more computer system symptoms and one or more computer system settings. The technique can also include transmitting (520) runnable content to client computer systems. The runnable content can include instructions the when executed o a computer system perform acts that include collecting feedback data including data on the one or more symptoms and the one or more settings for each of the one or more hypotheses; and transmitting the feedback data to a data store. Collecting the feedback data may include making one or more instrumentation measurements, such as one or more automated instrumentation measurements. The feedback data can be obtained (530) from the data store. The feedback data can be analyzed (540) to produce correlation information for each of the one or more hypotheses. The correlation information can include one or more correlation weights that each quantifies a degree of correlation between symptom(s) and setting(s) of a hypothesis. It can be determined (550) whether analysis of the feedback data warrants including at least one of the one or more hypotheses in a set of correlation mappings to be applied to set of one or more monitored computer systems (which may overlap with the monitored computer systems). The at least one of the one or more hypotheses can be included (555) in the set of correlation mappings if it is determined (550) that the inclusion is warranted by the feedback data. Mapping representations can be transmitted (560) to the monitored computer systems. The mapping representations can include instructions that when executed in the set of monitored computer systems, apply the set of correlation mappings to the monitored computer systems. An alert can be received (580) if it is determined (570) that criteria of one or more of the mappings are met in the set of monitored computer systems. The set of correlation mappings can be refined (590) based on analysis of additional feedback data received from the set of monitored computer systems. Refining (590) may include removing one or more mappings from the set of correlation mappings. For example, a determination may be made as to whether the analysis of the additional feedback data warrants retiring one or more mappings from the set of correlation mappings, i.e., not retaining the mapping(s) as one or more mappings or one or more hypotheses. If so, then refining (590) the set of correlation mappings can include retiring one or more mappings from the set. As another example, it may be determined whether the analysis of the additional feedback data warrants regressing one or more mappings from the set of correlation mappings to hypothesis status. If so, then one or more correlation mappings can be regressed from the set of correlation mappings to hypothesis status.

Additionally, updated runnable content can be transmitted (595) to the client systems. The updated runnable content can alter types of feedback data collected from the client systems.

As a specific example of using feedback data analysis for rules, consider an example. In this example, a rule's accuracy (A) can be the number of true positives divided by rule's sample size (S). The sample size (S) is the total number of positives (S) (both false positives and true positives). A positive here is an instance where the condition(s) of the rule were present. A true positive is an instance where the condition(s) of the rule corresponded to the symptom(s) of the rule. A false positive is an instance where the condition(s) of the rule did not correspond to symptom(s) of the rule.

A hypothesis may be included (555) in the set of mapping(s) when A is greater than a high accuracy threshold (e.g., 90%) and S is greater than a sample threshold (e.g., 1000). A hypothesis may be rejected when A is less than a specified minimum value (e.g., 70%) and S is greater than the sample threshold. A mapping may be removed from the set of mappings as part of the refinement (590) by being regressed to a hypothesis when A is less than a specified minimum value (e.g., 85%) and S is greater than the sample threshold. A mapping may be removed from the set of mappings as part of the refinement (590) by being retired if the sample size in the last cycle is less than a minimum cycle sample size (e.g., 5). Accordingly, this retirement may occur when the conditions are not in significant numbers occurring anymore, so that resources need not be wasted in enforcing the associated rules.

Accordingly, as changes occur over time (e.g., technology changes, patches are deployed, usage and configuration patterns change, interplay of conditions change), the rules can continue to run and the life cycle between hypotheses, mappings, and rejections/retirements can continue to repeatedly refine the set of correlation mappings.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
   receiving user input, the user input identifying one or more rules, each of the one or more rules relating one or more computer system symptoms to one or more computer system conditions;
   receiving feedback data from a plurality of client agents running on a plurality of client computer systems, the feedback data including data indicating presence of the one or more symptoms in the client computer systems for each of the one or more rules and indicating presence of the one or more conditions in the client computer systems for each of the one or more rules;
   analyzing the feedback data to produce correlation information for each of the one or more rules, the correlation information quantifying a degree of correlation between presence of the one or more symptoms and presence of the one or more conditions related by each of the one or more rules, the one or more rules comprising a set of one or more correlation mappings;
   generating computer support information derived from at least one of the one or more rules;
   transmitting one or more mapping representations to a set of monitored computer systems, the one or more mapping representations including instructions that, when executed in the set of monitored computer systems, apply the set of one or more correlation mappings to the set of monitored computer systems;
   receiving an alert if one of the mappings is met in a monitored computer system in the set of monitored computer systems;
   refining the set of correlation mappings, the refinement being based on analysis of additional feedback data received from the set of monitored computer systems; and
   altering types of feedback data collected from the plurality of client agents, the alteration being based on the correlation information.

2. The method of claim 1, wherein the one or more rules comprise one or more hypotheses and the set of one or more correlation mappings, and wherein the method further comprises determining whether the correlation information warrants including at least one of the one or more hypotheses in the set of one or more correlation mappings.

3. The method of claim 2, further comprising including the at least one of the one or more hypotheses in the set of one or more correlation mappings if it is determined that the inclusion of the at least one hypothesis is warranted by the feedback data.

4. The method of claim 2, wherein altering types of feedback data collected from the plurality of client agents comprises instructing the plurality of client agents to refrain from collecting data related to one or more rules that have been removed from the set of one or more mappings.

5. The method of claim 2, further comprising applying the set of one or more correlation mappings to the set of monitored computer systems, applying the set of one or more mappings including determining for each monitored computer system in the set of monitored computer systems whether one or more of the one or more mappings is met in that monitored computer system.

6. The method of claim 1, further comprising processing the alert.

7. The method of claim 1, wherein the refinement is based on the correlation information.

8. The method of claim 1, wherein the feedback data comprises one or more indications of one or more conditions that are not present on one or more computer systems.

9. The method of claim 1, further comprising instructing the client agents to limit the feedback data to data that meets one or more conditions.

10. The method of claim 1, wherein the correlation information comprises a correlation weight for each of the one or more rules.

11. A computer system comprising:
    at least one processor; and
    at least one memory including instructions stored thereon that when executed by the at least one processor cause the at least one processor to perform acts comprising:
      receiving feedback data from a plurality of client agents running on a plurality of client computer systems, the feedback data including data indicating presence of one or more computer system symptoms in the client computer systems for each of one or more rules and data indicating presence of one or more computer system conditions in the client computer systems for each of the one or more rules, each of the one or more rules relating one or more of the conditions to one or more of the symptoms;
      analyzing the feedback data to produce correlation information for each of the one or more rules, the correlation information quantifying a degree of correlation between presence of the one or more symptoms and presence of the one or more conditions related by each of the one or more rules;
      altering types of feedback data collected from the plurality of client agents, the alteration being based on analysis of the feedback data received from the client agents;
      determining whether the analysis of the feedback data warrants including at least one of the one or more rules in a set of correlation mappings to be applied to a set of one or more monitored computer systems;
      if the analysis of the feedback data warrants including at least one of the one or more rules in the set of correlation mappings, then including the at least one of the one or more rules in the set of correlation mappings; and
      transmitting mapping representations to the set of one or more monitored computer systems, the mapping representations including instructions that, when executed in the set of one or more monitored computer systems, apply the set of correlation mappings to the one or more monitored computer systems;
      receiving an alert if criteria of one or more of the mappings is met in the set of monitored computer systems; and
      refining the set of correlation mappings, the refinement being based on analysis of additional feedback data received from the set of one or more monitored computer systems.

12. The computer system of claim 11, wherein refining the set of correlation mappings comprises altering a mapping by adding a computer system condition item to the altered mapping.

13. The computer system of claim 11, wherein refining the set of correlation mappings comprises altering a mapping by removing a computer system condition item from the altered mapping.

14. The computer system of claim 11, wherein refining the set of correlation mappings comprises tracking correlation weights of the correlation mappings.

15. The computer system of claim 11, wherein refining the set of correlation mappings comprises removing one or more correlation mappings from the set of correlation mappings, the removal of the one or more correlation mappings being based on one or more correlation weights of the one or more removed correlation mappings.

16. The computer system of claim 11, wherein altering types of feedback data collected from the plurality of client agents comprises instructing the plurality of client agents to refrain from collecting data related to one or more rules that have been removed from the set of mappings.

17. One or more computer-readable storage media having computer-executable instructions embodied thereon that, when executed by at least one processor, cause the at least one processor to perform acts comprising:
receiving user input identifying one or more hypotheses, each of the one or more hypotheses relating one or more computer system symptoms to one or more computer system settings;
transmitting to client computer systems a first set of runnable content comprising instructions that when executed on a computer system performs acts comprising:
collecting feedback data including data indicating presence of the one or more symptoms and the one or more settings for each of the one or more hypotheses, collecting the feedback data comprising making one or more instrumentation measurements; and
transmitting the feedback data to a data store;
obtaining the feedback data from the data store;
analyzing the feedback data to produce correlation information for each of the one or more hypotheses, the correlation information including one or more correlation weights that each quantify a degree of correlation between presence of one or more symptoms and presence of one or more computer system settings of a hypothesis;
determining that analysis of the feedback data warrants including at least one of the one or more hypotheses in a set of correlation mappings to be applied to a set of one or more monitored computer systems;
including the at least one of the one or more hypotheses in the set of correlation mappings in response to the determination that the inclusion is warranted by the feedback data;
transmitting mapping representations to the monitored computer systems, the mapping representations including instructions that, when executed in the set of monitored computer systems, apply the set of correlation mappings to the monitored computer systems;
receiving an alert if criteria of one or more of the mappings is met in the set of monitored computer systems;
refining the set of correlation mappings, the refinement being based on analysis of additional feedback data received from the set of monitored computer systems; and
transmitting a second set of runnable content to the client systems, the second set of runnable content altering types of feedback data collected from the client systems.

18. The one or more computer-readable storage media of claim 17, wherein refining the set of correlation mappings comprises:
determining that the analysis of the additional feedback data warrants retiring one or more mappings from the set of correlation mappings; and
in response to determining that the analysis of the additional feedback data warranting retiring one or more mappings from the set of correlation mappings, retiring one or more mappings from the set of correlation mappings.

19. The one or more computer-readable storage media of claim 17, wherein refining the set of correlation mappings comprises:
determining that the analysis of the additional feedback data warrants changing one or more mappings from the set of correlation mappings to hypothesis status; and
in response to determining that the analysis of the additional feedback data warrants changing one or more mappings from the set of correlation mappings to hypothesis status, changing the one or more mappings from the set of correlation mappings to hypothesis status.

20. The one or more computer-readable storage media of claim 17, wherein the second set of runnable content comprises one or more instructions instructing the client systems to refrain from collecting data related to one or more rules that have been removed from the set of correlation mappings.

* * * * *